(12) United States Patent
Razzaghi et al.

(10) Patent No.: US 6,508,916 B1
(45) Date of Patent: *Jan. 21, 2003

(54) PROCESS FOR RECOVERING PROCESSING LIQUIDS

(75) Inventors: Minoo Razzaghi, Calgary (CA);
Stephen G. Kresnyak, Calgary (CA);
Brian A. Keast, Calgary (CA);
Timothy W. Giles, Calgary (CA)

(73) Assignee: Canadian Chemical Reclaiming Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/332,801

(22) Filed: Jun. 14, 1999

(51) Int. Cl.[7] .............................. B01D 3/42; B01D 3/10; C02F 1/04
(52) U.S. Cl. .................... 203/11; 159/44; 159/47.3; 159/DIG. 16; 203/1; 203/2; 203/22; 203/27; 203/75; 203/77; 203/78; 203/80; 203/DIG. 8
(58) Field of Search .............................. 203/14, 80, 77, 203/1, 40, 11, 90, 73, 2, 78, 20, 74, 75, 100, 27, 22, DIG. 8; 202/205, 236, 160, 237; 159/23, 47.3, 48.1, DIG. 4, 44, DIG. 16; 95/242, 243, 251; 210/774

(56) References Cited

U.S. PATENT DOCUMENTS

| | | | |
|---|---|---|---|
| 3,676,485 A | | 7/1972 | Lewis et al. |
| 3,803,005 A | | 4/1974 | Miserlis et al. |
| 4,261,814 A | * | 4/1981 | Pfeifer ........................ 208/356 |
| 4,315,815 A | | 2/1982 | Gearhart |
| 4,770,747 A | | 9/1988 | Muller |
| 4,844,812 A | | 7/1989 | Haynes et al. |
| 4,942,223 A | | 7/1990 | Takao et al. |
| 5,076,895 A | | 12/1991 | Greenfield et al. |
| 5,152,887 A | | 10/1992 | Beasley et al. |
| 5,158,649 A | | 10/1992 | Beasley et al. |
| 5,312,524 A | * | 5/1994 | Barcomb ..................... 202/177 |
| 5,389,208 A | | 2/1995 | Beasley et al. |
| 5,441,605 A | | 8/1995 | Beasley et al. |
| 5,458,739 A | | 10/1995 | Boucher et al. |
| 5,993,608 A | * | 11/1999 | Abry et al. .................... 203/11 |

* cited by examiner

Primary Examiner—Virginia Manoharan
(74) Attorney, Agent, or Firm—Browning Bushman P.C.

(57) ABSTRACT

A process for recovering processing liquids such as gas-treating liquids wherein a feed mixture containing the processing liquid, water, and optionally additional components that are more volatile than the processing liquid and components that are less volatile than the processing liquid, is initially heated in a first heating zone to a temperature sufficient to volatilize at least some of the water and a portion of the processing liquid without decomposing the processing liquid to produce a vapor stream containing volatilized water and processing liquid and a residuum containing the bulk of the processing liquid and less volatile component, the vapor stream being separated from the residuum and treated to produce recycle streams of water, purified processing liquid, and low and high boiling liquid fractions recovered from the purified processing liquid.

17 Claims, 2 Drawing Sheets

PROCESS FOR RECOVERING PROCESSING LIQUIDS

BACKGROUND OF THE INVENTION

1. Field of the Invention

The present invention relates to process for recovering a processing liquid and, more particularly, to a process for recovering a processing liquid from a mixture comprising water, a processing liquid having a higher boiling point than water, optionally at least one additional component that is more volatile than the processing liquid and water, and at least one component that is less volatile than, and can be dissolved or suspended in, the processing liquid.

2. Description of the Prior Art

There are numerous industrial processes wherein a liquid, hereinafter referred to as a processing liquid, which can comprise one or more components, is used in such a fashion that it becomes contaminated with, or contains, various components, some of which are more volatile than the processing liquid and some of which are less volatile and can be dissolved in the processing liquid. Usually, the components in the processing liquid are contaminants, although they may be desirable,: recovered components, depending on the process in which the processing liquid is used. In such cases, it is almost universally desirable to separate the processing liquid from the less volatile and more volatile components so that the processing liquid can be reused in the process or simply recovered in a substantially pure state for reuse or other uses.

Numerous examples of the above described general scheme of using a processing liquid abound. For example, it is well known that natural gas produced from oil and gas wells, in addition to containing gaseous hydrocarbons, such as methane, ethane, etc., almost invariably contains water and acidic gases, such as $CO_2$ and $H_2S$. In cases where the natural gas contains water, it is very common for so-called gas hydrates or clathrate hydrates to form. These clathrate hydrates are crystalline compounds that occur when water forms a cage-like structure around guest molecules, particularly gaseous molecules.

While the phenomena can occur in any system wherein there is water and gaseous compounds, e.g., hydrocarbons, the problem, at times, becomes especially acute in the petroleum industry, not only with respect to the production of gaseous hydrocarbons such as natural gas, but also in the transporting and processing of natural gas. As noted, typical gas hydrates formed in petroleum (hydrocarbon) environments are composed of water and one or more guest molecules, such as methane, ethane, propane, isobutane, nitrogen, carbon dioxide, and hydrogen sulfide. However, it is also known that other guest molecules such as nitrous oxide, acetylene, vinyl chloride, ethyl bromide, oxygen, etc., can form clathrate hydrates.

With particular reference to natural gas systems and by example only, when gas hydrate crystals form, they can become a nuisance at least and pose a serious problem at worst. Gas hydrates can block transmission lines and plug blowout preventers, jeopardize the foundations of deep water platforms and pipelines, collapse tubing and casing, and foul process equipment, such as heat exchangers, compressors, separators, and expanders. To overcome these problems, several thermodynamic measures are possible in principal: removal of free water, maintaining an elevated temperature and/or reduced pressure, or the addition of freezing point depressants. As a practical matter, the last mentioned measure, i.e., adding freezing point depressants, has been most frequently applied. Thus, lower alcohols, such as methanol, ethanol, etc., and glycols have been added to act as antifreezes.

While processing liquids such as alcohols and glycols used in natural gas production, transportation, and processing are effective at reducing gas hydrate formation, their use is not without problems. As is well known, the production of natural gas is frequently accompanied by the production of brine, containing sodium chloride and other water-soluble salts. While these halides, such as the alkali metal halides, are readily soluble in water, they also exhibit substantial solubility in the alcohols and glycols used to prevent gas hydrate formation. Accordingly, the processing liquid—in this case the alcohol, glycol, or the like—becomes contaminated with dissolved salts present in the produced water, as well as with certain gases, which, depending on the particular gas, are soluble in the processing liquid. Thus, this presents a specific example where a processing liquid has been used, in this case to prevent hydrate formation, and has now become contaminated with a more volatile component and a less volatile, and in this case dissolved, component.

Again, using the example of natural gas production, transportation, and processing, it is necessary that the natural gas be freed of acidic components, such as $CO_2$, $H_2S$, sulfur oxides, etc., some of which are quite toxic, all of which can lead to severe corrosion problems and in certain cases the formation of unwanted by-products. It is common to scrub the natural gas stream with processing liquids such as liquid amines, particularly alkanolamines such as monoethanolamine (MEA); diethanolamine (DEA); methyldiethanolamine (MDEA), as well as glycols such as mono-, di-, or tri-ethylene glycol. Since scrubbing of natural gas to remove acidic gases is normally conducted on natural gas streams that have been substantially freed of water, the dissolved salt content of the natural gas stream from the gas stream is generally quite small. However, even though the ingress of dissolved salt is low from the natural gas stream, continuous use of the amine process liquid for acid gas removal tends to cause the amine to break down with contaminants and create heat-stable, unregenerable salts. If the residual buildup of heat-stable salts (HSS) is permitted to build to typical levels in excess of 1% by weight, the amine performance will decline, corrosion increases rapidly with a decline in pH, and the amine solution begins to foam, creating excessive process liquid losses. Accordingly, the processing liquid, e.g., the alkanolamine, will generally contain dissolved, less volatile components at a much smaller concentration than in the case of an alcohol or glycol used to prevent gas hydrate formation. Nonetheless, even in this instance, the processing liquid now presents a case where, after use, it contains more volatile components, e.g., $CO_2$ $H_2S$, etc., and perhaps a small amount of less volatile and dissolved component.

In the case where treatment of the natural gas to prevent gas hydrate formation and/or remove acidic gases is conducted on offshore platforms, several problems are encountered. For one, the alcohols, glycols, and alkanolamines can be toxic to marine life and accordingly, once spent, e.g., saturated with contaminants that they are being used to remove, cannot be discharged overboard. Aside from ecological concerns, such a method is economically not feasible since it requires a constant replenishment of the processing liquid. Indeed, such a process would not be economically feasible in land-based refineries, chemical plants, or the like.

U.S. Pat. Nos. 5,152,887; 5,158,649; 5,389,208; and 5,441,605 all deal with processes and apparatus for reclaiming and/or concentrating waste aqueous solutions of gas treating chemicals. Additionally, U.S. Pat. Nos. 4,315,815, and 4,770,747 likewise deal with processes for reclaiming or recovering gas-treating liquids. U.S. Pat. No. 5,389,208, incorporated herein by reference for all purposes, discloses and claims a method for reclaiming an impurity-containing waste aqueous solution of a gas-treating chemical that basically involves vacuum distillation of the spent material under temperature conditions that prevent decomposition of the gas-treating chemical and in such a fashion that the process can be operated in apparatuses made of carbon steel, as opposed to more exotic materials of construction, without causing substantial corrosion of the apparatus.

In U.S. patent application Ser. No. 08/846,036, filed Apr. 25, 1997, now U.S. Pat. No. 5,993,608, there is disclosed a process for recovering processing liquids wherein components less volatile than the processing liquid such as dissolved and/or suspended solids are removed from the processing liquid under conditions that prevent any substantial degradation of the processing liquid.

SUMMARY OF THE INVENTION

It is therefore an object of the present invention to provide an improved process for separating a processing liquid from more volatile and less volatile components contained in the processing liquid.

Another object of the present invention is to provide a continuous process for recovery a processing liquid wherein decomposition of the processing liquid is prevented at reduced vacuum conditions and 95% or more of the processing liquid is recovered essentially free of the more and less volatile components.

Still a further object of the present invention is to provide a process for treating a processing liquid so as to remove from the processing liquid more volatile and less volatile components using, at least in part, processing apparatuses made of carbon steel.

Yet another object of the present invention is to provide a process for separating dissolved and/or suspended solids from a processing liquid under conditions that prevent any substantial degradation of the processing liquid.

The above and other objects of the present invention will become apparent from the drawings, the description given herein, and the appended claims.

According to the process of the present invention, a stream of a feed mixture comprising water, a processing liquid having a higher boiling point than water, optionally at least one additional component that is more volatile than the processing liquid and water, and at least one component that is less volatile than the processing liquid, is introduced into a first heating zone and initially heated to a temperature sufficient to volatilize at least some of the water and at least a portion of the processing liquid. The temperature in the first heating zone is maintained below the decomposition temperature of the processing liquid, and there is produced a vapor stream comprising volatilized water and the volatilized portion of the processing liquid, and a residuum comprising the unvolatilized processing liquid, a reduced concentration (perhaps none) of the more volatile component, and at least some of the less volatile component. The vapor stream is separated from the residuum in a first separation zone and a portion of the residuum is passed through a second heating zone, also at a temperature below the decomposition temperature of the processing liquid, to produce a heated, first recycle stream. The concentration of the less volatile component in the residuum is reduced either by purging a portion through a blowdown stream of the residuum or through a solids, liquid separation zone to produce a substantially solids-free, second recycle stream and a substantially solids waste stream, the second recycle stream being recycled to the first separation zone. In one embodiment, the vapor stream is treated to recover a water stream and a purified processing liquid stream, and at least a portion of at least one of the water stream and the purified processing stream is admixed, by recycle, with the stream of said feed mixture. In a variation, the vapor stream is treated to recover a water stream and a purified processing liquid stream, and the purified processing liquid stream is separated into a low boiling liquid fraction and a high boiling liquid fraction, at least of portion of at least one of the water stream, the high boiling liquid fraction, and the low boiling liquid fraction being admixed, by recycle, with the stream of feed mixture. Basically, it can be seen that, depending upon how the process is operated, at least one or all of at least a portion of the water stream, the purified processing liquid stream, the low boiling liquid fraction, or the high boiling liquid fraction can be recycled to the stream of the feed mixture.

DESCRIPTION OF THE PREFERRED EMBODIMENTS

Figure 1:
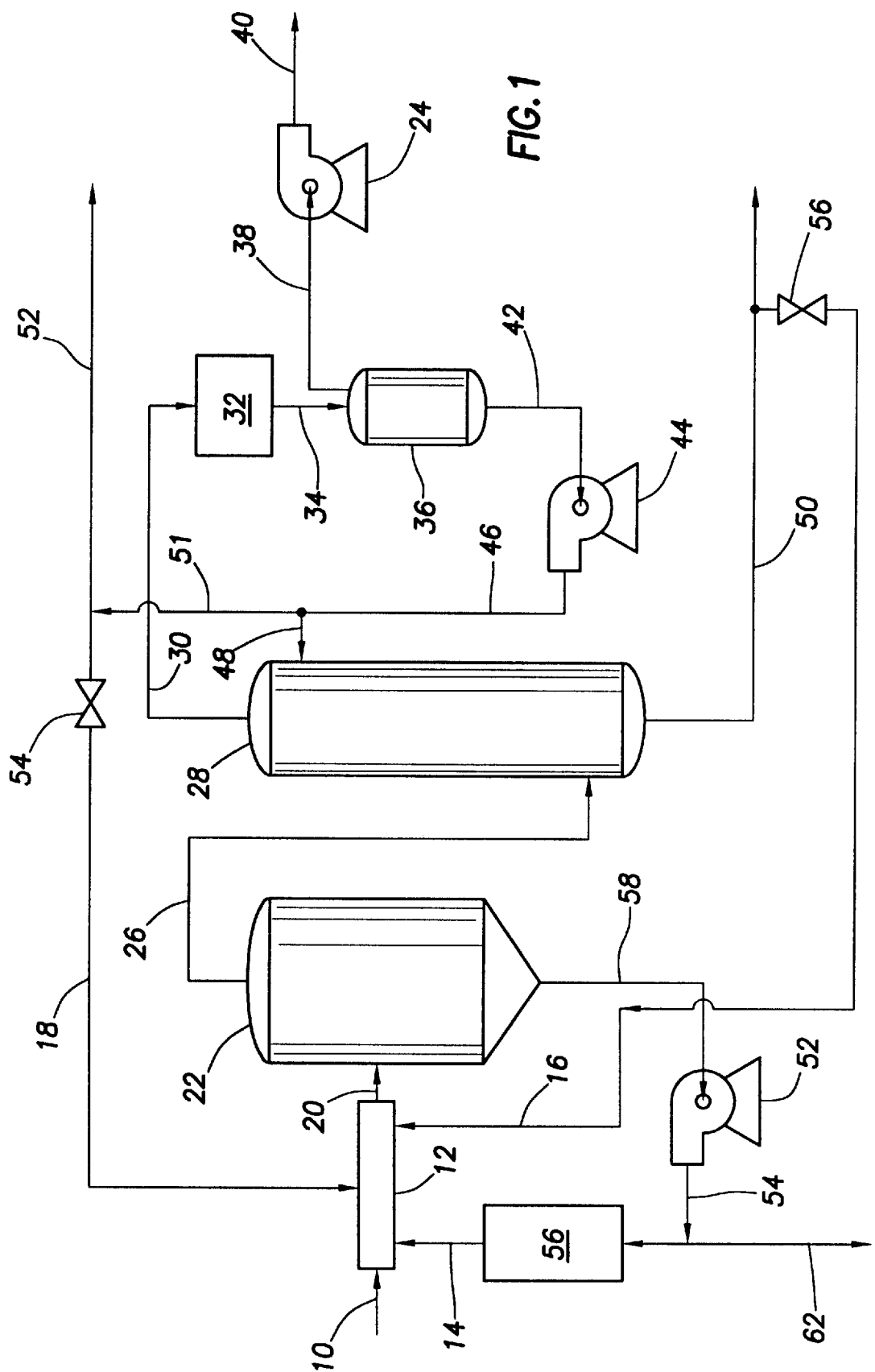
FIG. 1 is a schematic, flow diagram of one embodiment of the process of the present invention.

The term "processing liquid" as used herein refers to any aqueous or non-aqueous liquid that can contain one or more components and includes, without limitation, gas treating chemicals such as alkanolamines, e.g., monoethanolamine (MEA), diethanolamine (DEA), methyldiethanolamine (MDEA); or glycols such as monoethylene glycol (MEG), diethylene glycol (DEG), triethylene glycol (TEG), tetraethylene glycol (TTEG), and propylene glycol (PEG), as well as halogenated solvents, liquid hydrocarbons including aromatic compounds, olefinic compounds, aliphatic compounds, water, and mixtures of water and other water-miscible materials, etc. Further, a processing liquid as used herein refers to a liquid that is used in a particular process such that it becomes contaminated with, or at least after use contains, components not normally present in the processing liquid. Thus, the processing liquid can be a gas scrubbing medium used to remove undesirable contaminants from gas streams, a selective solvent to recover desirable components from gaseous or liquid streams, a medium used to treat solids to selectively remove certain components of the solids, etc. Accordingly, while in the examples given herein the invention will be described with reference to the scrubbing of gas streams, particularly natural gas streams, it will be understood that the invention is not so limited.

In cases where the processing liquid is used in natural gas operations, non-limiting examples of contaminants or components that may be present in the processing liquid and that need to be removed include acid gases such as hydrogen sulfide, carbon dioxide, sulfur oxides and more volatile liquid components such as water, liquid hydrocarbons, etc. Non-limiting examples of less volatile components or contaminants present in the processing liquid that need to be removed therefrom include inorganic salts such as alkali metal halides; iron salts; salts of organic acids; carbonates; and numerous other organic and inorganic components that are less volatile than the processing liquid and that are dissolved in the process liquid or that are present in generally non-filterable form, e.g., colloidal suspensions. While generally speaking the less volatile component will be a dissolved and/or suspended solid, the latter being generally non-filterable, it is to be understood that the less volatile component can comprise a liquid that is higher boiling than the processing liquid and that, because it is a liquid, would not normally cause fouling or solid buildup in the lines of the process but that, under certain conditions, can form solids or emulsions and therefore must be removed from the processing liquid. Further, such high boiling liquids may affect the operating efficiency of the processing liquid and therefore must be removed or at least have their concentration reduced in the processing liquid to maintain overall processing liquid performance efficiency.

As used herein, the term "feed mixture" includes water, a processing liquid having a higher boiling point than water, and optionally at least one additional component more volatile than the processing liquid and at least one less volatile component than the processing liquid, the concentration of such more or less volatile components being dependent upon the nature of the processing liquid, the type of processing in which the processing liquid is used, and other such factors well known to those skilled in the art. Thus, the feed mixture, as used in the description that follows, refers to the material that is to be treated in accordance with the process of the present invention to reduce or substantially eliminate the more volatile components from the feed mixture and substantially reduce, if not eliminate, the less volatile components from the feed mixture.

As indicated above, depending upon which processing liquid is being used and the conditions under which it is being used, it will contain more or less of the less volatile component, i.e., the dissolved and/or suspended component. In cases where the less volatile component is present in relatively small amounts, e.g., from about 10 ppm to about 60,000 ppm by weight of the feed mixture, and depending on the particular processing liquid employed, reduction of the concentration of the less volatile component can generally be accomplished by purge, e.g. a blowdown stream in the process. Alternately, when the less volatile components in the feed mixture are present in higher amounts, e.g., from about 3 to about 30% by weight, and again depending on the particular processing liquid employed, other steps may be necessary to reduce the concentration of the less volatile component in the processing liquid to maximize recovery of the processing liquid. For example, a solids-liquid separation step can be employed with the separated liquid being recycled to the first separation zone.

With reference then to FIG. 1, a feed mixture, such as, for example, an alkanolamine such as MEA, that has been used to remove acidic gases from a natural gas stream and that contains acidic gases, water, MEA (the processing liquid), and less volatile components, e.g., dissolved or suspended solids, high boiling liquids, etc., is introduced via line 10 from a gas processing facility through a flow or line mixer 12, where it is mixed with one or more recycle streams, described more fully hereafter, introduced into mixer 12 via lines 14, 16, and 18. Line or flow mixers are employed since it is preferable to operate the process in a continuous manner. Typical of such mixers are jet mixers, injectors, orifices and mixing nozzles,. centrifugal pumps, and agitated line mixers. It will be appreciated that while line or flow mixers are preferred, in certain cases, if holding time is desired, agitated vessels may be employed. The mixture of the recycle streams and the feed mixture from line 10, after being thoroughly mixed in mixer 12, is introduced via line 20 into a first separation zone formed by a still or flash vessel 22. As explained hereafter, heat necessary to effect separation in the first separation zone is imparted to the feed mixture by heat transfer from the heated recycle stream from line 14 to the feed mixture entering mixer 12 from line 10. It will be appreciated that the first separation zone in still 22 includes a lower, substantially liquid phase zone and an upper, substantially vapor phase zone, an interface being formed between the two zones.

In the embodiment shown in FIG. 1, the first separation zone in still 22 is maintained under a vacuum by means of a vacuum pump such as pump 24, forming part of a downstream, second separation zone. In the process described in U.S. patent application Ser. No. 08/846,036, now U.S. Pat. No. 5,993,608, it was necessary to employ relatively high vacuum conditions, e.g., 16 inches of mercury. Using the process of the present invention, it has been found that minimum vacuum conditions, e.g., less than 5 inches of mercury, will suffice. In any event, vapor or gases flashed from the heated feed mixture in still 22 pass overhead via line 26 to a concentrator or distillation column 28, where a light, overhead fraction is removed via line and passed through a condenser 32 and thence via a line 34 into a gas/liquid separator 36, e.g., a gravity separator allowing sufficient stilling time to effect gas/liquid separation. Light, non-condensables are removed from separator 36 via line 38 and pump 24 and are sent via line 40 for recovery, incineration, or other disposal. Liquids separated in separator 36 are removed via line 42, a portion being circulated via pump 44 and lines 46 and 48 as reflux to column 28.

Depending upon the temperature and the degree of vacuum in still 22, a certain amount of the processing liquid is taken overhead via line 26 and introduced into column 28. Once disengaged from the more volatile components, the condensed, purified processing liquid is then removed from column 28 as a bottoms fraction via line 50. The term "purified" as applied to the processing liquid in line 50 means that the processing liquid has been freed of most of the water and other lower boiling components and the bulk of the heavier boiling components and dissolved and/or suspended solids.

In the process described in U.S. patent application Ser. No. 08/846,036, now U.S. Pat. No. 5,993,608, the liquid (essentially clean water) removed from separator 36 was separated into a first portion, which was circulated as reflux to column 28, while the remaining portion was discharged from the system. In the present process, a portion of this water removed from separator 36 is, as noted above, also used as reflux to distiller 38. Additionally, a portion is discharged from the system via line 52. However, unlike the process disclosed in the aforementioned U.S. patent application, at least a portion of the water removed from separator 36 is selectively recycled via valve 54 and line 18 to the stream of the feed mixture, the water recycle being preferably admixed with the feed mixture in mixer 12.

Water recycle via line 18 provides many advantages over the prior art process. For example, in the processing of high boiling amines such as DEA or TEG, the introduction of water into the feed mixture enables the vacuum requirements to be relaxed while still permitting the process to operate within acceptable temperature ranges so as to prevent degradation of those solvents. Additionally, by controlling the amount of water recycled via valve 54 and line 18, the temperature and pressure in still 22 can be more easily controlled. Water recycle also lowers the vapor volumetric flow rate through the system because of increased vapor density and accordingly permits a reduction in the size of still 22 and distillation column 28. A corollary of this is the improvement in hydraulic loading in the still 22. Water recycle also reduces the sensitivity to fluxuations in the feed mixture or feed rate. For example, if the water content of the feed mixture in line 10 is too low, rendering the process unstable, water recycle enables the water content of the feed rate to be raised to the point where the system regains stability. Overall, it can be seen that the use of water recycle allows for greater overall control of the system, lower cost operating conditions, and lower capital costs resulting from smaller vessels, piping, etc.

In the process described in U.S. patent application Ser. No. 08/846,036, now U.S. Pat. No. 5,993,608, none of the processing fluid removed from column 28 was recycled to the stream of feed mixture. In the process herein, at least a portion of the processing fluid removed from column 28 via line 50—i.e., the purified processing fluid—can be recycled via valve 56 and line 16 to the stream of feed mixture. This recycle of purified processing liquid, alone or in conjunction with water recycle as described above, concentrates the less volatile, lower value solvents and contaminants in the purge loop, thereby more efficiently removing them from the purified processing liquid. Additionally, recycle of the purified processing liquid enhances control of the bottoms temperature in column 28 while at the same time improving the hydraulics in column 28 by normalizing any changes in the composition of the feed mixture or the feed rate thereof.

It will be recognized by those skilled in the art that depending upon the particular processing liquid, the composition of the feed mixture, and other such variables, the amount of recycle of the water and/or the purified processing liquid streams can vary over wide limits, it being understood that under certain circumstances, all or a portion of one stream might be recycled with no recycle of the other stream, or a portion of each of the streams could be recycled.

With reference again to FIG. 1, comprising the liquid phase in still 22, contains the bulk of the processing liquid, a vastly reduced concentration of any more volatile components, e.g., gases and/or water, and substantially all of the less volatile components, e.g., higher boiling liquids and/or dissolved and/or suspended solids. A portion of this residuum is removed via line 58 and circulated via pump 52 and line 55 through a second heating zone 56. Second heating zone 56 can comprise apparatuses well known to those skilled in the art and can include, for example, the heater disclosed in U.S. Pat. No. 5,389,208, comprising a tube bundle that is heated by heat exchange with combustion gases from natural gas or other combustible gases, all as taught in U.S. Pat. No. 5,389,208. While heating zone 56 can take many forms, it is preferred that the heating zone be of the type whereby residence times can be kept to a minimum to avoid overheating of the residuum and concomitant decomposition of the processing liquid. To this end, recirculation of the residuum through heating zone 56 is conducted at a flow rate of 10 feet per second or greater, preferably from about 11 to about 16 feet per second. Maintaining these high flow rates through heating zone 56 minimizes the likelihood that there will be excessive heating of fluid in the film zone adjacent the heat exchanger surfaces, which could cause vaporization and/or degradation of the processing liquid. Furthermore, the high flow rates minimize coking or scaling of the interior heat exchanger surfaces. Lastly, the high flow rate aids, in conjunction with back pressure regulation, discussed more fully hereafter, in preventing vaporization at the heat exchanger surfaces.

To control foaming in the separation zone in still 22, a portion of the residuum stream can be recycled and introduced into still 27 in the upper portion through a spray head or the like, which directs a spray of the residuum toward the inter-facial area defined by interface of the vapor phase and the liquid phase in still 22. If desired, other foam suppressants by way of additives can be introduced into still 22.

In the embodiment described in FIG. 1, when the amount of the less volatile component in the feed mixture is at a relatively low level, and particularly when such less volatile component is a dissolved and/or suspended solid, precipitation of any dissolved solid can be avoided by proper blowdown or purging of residuum from still 22. In this regard, a blowdown or purge stream of residuum is removed from still 22 via line 62 and discharged as waste. The amount of blowdown or purge via line 62 will be dependent upon the concentration of any dissolved and/or suspended solids in the residuum, i.e., the liquid phase removed from still 22, which in turn will depend upon the concentration of such less volatile component in the feed mixture and the solubility characteristics in the residuum. In any event, by proper control of the amount of blowdown via line 62, the recycle stream, which is heated in heating zone 56, can be maintained at near saturation levels without precipitation of any solids. By way of example, a typical feed mixture from a glycol scrubber used to prevent hydrate formation will contain 49.5% by weight monoethylene glycol, 49.5% by weight water, and 1% by weight sodium chloride. To prevent saturation of the glycol residuum and precipitation of salt, estimated at 8% by weight, a 15% blowdown stream relative to feed to the separation zone is removed on a continuous basis such that the residuum will not exceed the concentration of near 6% by weight or 6 times concentration. The resulting equilibrium. residuum will have a composition of about 93% by weight glycol, 1% by weight water, and 6% by weight salt. This purge of residuum, coupled with the high flow rates through heating zone 56, permits the application of sufficient heat energy into recirculating fluid in recycle stream 14 to supply all of the heat necessary to effect vaporization in the first separation zone in still 22 without permitting precipitation of dissolved solids, which would greatly reduce efficiencies and could render the portion of the residuum being recycled virtually unpumpable. Thus, by using the process of the present invention, as depicted in FIG. 1, and when the feed mixture contains relatively small amounts of dissolved solids, it is possible to recover 95% or more of the processing liquid on a continuous basis.

Frequently, the feed mixture contains a high concentration of the less volatile components—i.e., from 3 to 30% by weight. For example, a glycol mixture used to prevent gas hydrate formation in a natural gas processing operation would typically contain high dissolved solids such as alkali metal halides, carbonates, etc., on the order of 6 to 15% by weight. When such high levels of entrained or dissolved solids are present, it is advantageous to subject a slip stream of the residuum from still 22 to a solids/liquid separation wherein solids are separated and removed as a slurry. To this end, and as disclosed in U.S. patent application Ser. No. 08/846,036, now U.S. Pat. No. 5,993,608, purge line 62 would be dispensed with in favor of a line that would remove a slip stream between pump 52 and second heating zone 56, the slip stream being introduced into a suitable solids/liquid separation device wherein solids would be separated and a liquid fraction recycled to still 22. When solids/liquid separation is employed, the amount of residuum via the slip stream that is sent to the solids/liquid separator will range from about 1 to about 90% by weight of the total volume of residuum passing out of still 22 via line 58, more preferably from about 1 to about 40% by weight, most preferably from about 5 to about 15% by weight. Suitable solids/liquid separating devices that can be employed include cyclones, screens, centrifuges, etc. By effecting a continuous removal of solids from the recirculating residuum as described above using a solids/liquid separator, the circulating residuum remains fluid and pumpable and ensures that high, annular velocities through the heating zone 56 can be maintained.

Figure 2:
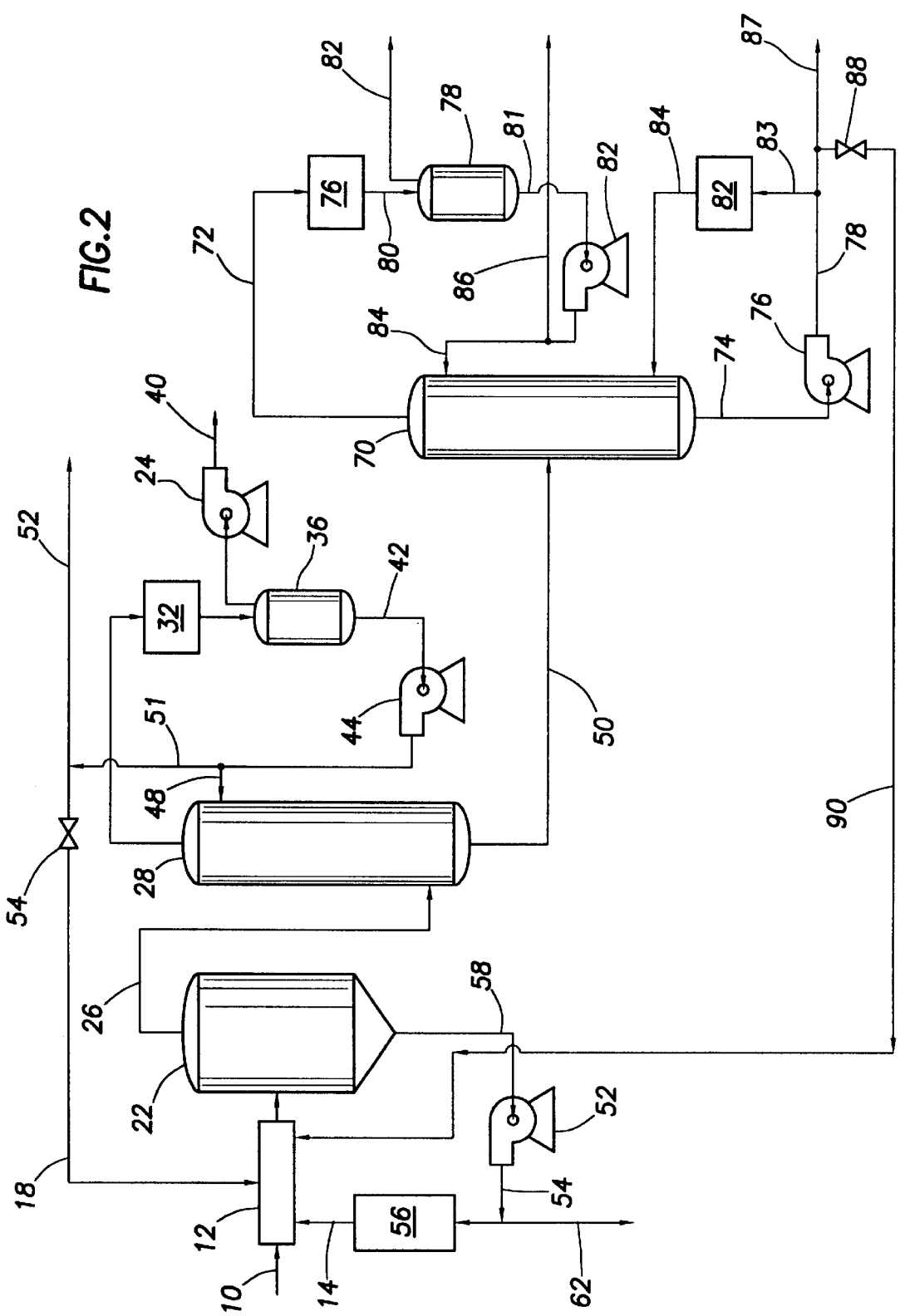
FIG. 2 is a schematic, flow diagram of another embodiment of the process of the present invention.

With reference now to FIG. 2, there is shown another embodiment of the process of the present invention. The process depicted in FIG. 2 differs from that in FIG. 1 in that, rather than recycling a portion of the purified processing liquid removed from distillation column 28 via line 50, the purified processing liquid is instead sent to a fourth separation zone containing a distillation column 70. Ideally, column 70 is of the type that employs both rectification and stripping sections and, as noted, is operated under vacuum. The purified processing liquid enters column 70, via line 50, a lower boiling gaseous fraction being removed overhead via line 72, a higher boiling liquid fraction being removed from the bottom of column 70, via line 74. The lower boiling fraction in line 72 enters condenser 76 and separation drum 78 via line 80, any remaining gaseous materials or water being removed as an overhead fraction via line 82, which can be connected to pump 24 as a vacuum source or to a separate vacuum source as desired. A low boiling liquid fraction, stripped of gases and water, is removed from separation drum 78 via line 81 and pump 82 and recycled to column 70 via line 84, a portion being removed via line 86. It will be understood that at least a portion of the low boiling liquid fraction in line 86 may, if desired, be recycled to the stream of feed mixture—i.e., to mixer 12. The high boiling liquid fraction removed from the bottom of column 70 via line 74 is pumped via pump 76, lines 78 and 83, through a reboiler 82 and then to the base of column 70, via line 84. A portion of the high boiling liquid fraction can be removed for further processing via line 87. Alternatively, at least a portion of the high boiling liquid fraction that is not being recycled to column 70 can be recycled via valve 88 and line 90 to the stream of feed mixture, e.g., to mixer 12.

By recycling the high boiling liquid fraction via valve 88 and line 90, one is able to concentrate high boiling, lower value solvents and contaminants in the main purge stream, e.g., stream 62. Furthermore, recycling at least a portion of the high boiling liquid fraction enhances the ability to control the temperature at the base of distillation column 70, which is an important consideration when there is a higher concentration of the high boiling liquid fraction than the low boiling liquid fraction and the low boiling liquid fraction, being the processing liquid, is the most valued, product. Additionally, recycling a portion of the high boiling liquid fraction reduces the boiling point of the liquid in line 78, thereby minimizing the likelihood that the high boiling liquid fraction will be degraded due to excessively high temperatures. Further, it will be appreciated that by having the flexibility to recycle a portion of one or both of the low boiling liquid fraction and the high boiling liquid fraction, the impact of composition changes in the feed mixture or feed rate can be minimized without seriously affecting the operation of distillation column 28.

It will thus be appreciated that according to the process of the present invention, at least a portion of any or all of the water stream in line 46, the purified processing liquid in line 50, the low boiling liquid fraction in line 86, and the high boiling liquid fraction in line 78, can be recycled to the feed mixture to achieve overall better process control via permitting still 22 to operate at lower temperatures or reduced vacuum, normalizing compositional changes in the feed mixture and feed rate, etc.

It will be appreciated that in either of the embodiments shown in FIGS. 1 or 2, blowdown or purge via line 62 or solids/liquid separation as discussed above in some detail with respect to the process as shown in FIG. 1 can be employed. Likewise, foam suppression as described above with respect to the process described in FIG. 1 can also be employed in the process described in FIG. 2.

It was observed in U.S. Pat. No. 5,389,208 that flow rate through the recirculating liquid or residue (in this case, the residuum) through the heater tubes of heating zone 56 should be at least 6 feet per second, and more preferably 7 to 10 feet per second. Indeed, in the case where the heater tubes forming heater zone 56 are of carbon steel, flow velocities in excess of about 10 feet per second are conventionally thought to be highly erosive, and therefore other materials of construction, such as hardened steel alloys or the like, are used. Nonetheless, it was unexpectedly and surprisingly found that flow rates in excess of 10 feet per second and preferably 11 to 16 feet per second through the heater tubes could be achieved even though the heater tubes are made of carbon steel and that little or no erosive effect on the tubes is observed. This unexpected result is believed to be a function of controlling the solids in the recycled residuum by means of the blowdown through line 62, as well as by controlling the flow rate, pressure, and temperature in heating zone 56.

As described in U.S. patent application No. 08/846,036, now U.S. Pat. No. 5,993,608, back pressure regulation can be used advantageously with high flow rates and process purging or blowdown. In particular, back pressure regulation is employed to avoid several problems that can lead to decomposition of the processing liquid, inefficient process operation, two-phase flow in the heater tubes and connecting piping in the recirculating loop through which the residuum flows, and several other problems. Back pressure regulation can be employed at several locations in the recirculating loop, its preferred location being dependent upon the content of the less volatile components, particularly the content of dissolved and/or suspended solids in the feed mixture and the solubility characteristics of the residuum. Preferably, in the case when the dissolved and/or suspended solids content of the feed mixture and hence the residuum is relatively low, i.e., on the order of less than about 10,000 ppm by weight, back pressure regulation is best effected between heater 56 and line mixer 12. By imposing back pressure regulation on heater 56, two-phase flow through the tubes in heater 56 is substantially avoided. This is desirable since once two-phase flow commences, the back pressure on the main circulation pump 52 can become irregular, resulting in a detrimental effect on the circulating residuum, evidenced by a further reduction of pressure within the heater tubes. This reduction in pressure in the heating tubes and an increase in temperature, in addition to accelerating vaporization at the tube walls and creating two-phase flow, results in fluid velocities that cause process upsets and instabilities, surface scaling on the tube walls, and premature metal failure. Additionally, two-phase flow via vaporization of the residuum at the interface of the inner tube walls reduces the heat transfer efficiency in heater 56. Accordingly, by maintaining back pressure regulation in the tubes in heater 56, more uniform flow and controlled temperature use of residuum through the heater tubes is achieved. Thus, rather than having annular fluid flow in which an annulus of vapor (likely to decompose) is flowing adjacent the tube walls and a core of residuum liquid is flowing through the central part of the tubes, essentially the annulus of gas or vapor is eliminated, i.e., the tube walls remain wetted. In this case, since the circulating residuum passing through heater 56 contains dissolved and/or entrained solids, this flashing at the inner tube walls, while not only leading to possible decomposition of the processing liquid, also contributes to fouling or coking on the inner tube walls by the dissolved and/or suspended solids precipitating from the circulating residuum.

Preferably, back pressure regulation is effected by means of a flow restriction, which, to the extent possible, provides streamline or viscous flow and minimizes turbulent flow. For example, a suitable flow restriction to effect-back pressure regulation comprises a Venturi flow restriction. Other types of back pressure regulators or flow restrictors that prevent or minimize downstream turbulent flow can be used, as is well known by those skilled in the art.

It is important that any vaporization of residuum in the lines connecting still 22 and mixer 12 be minimized and ideally eliminated. Accordingly, it is preferred that any back pressure regulation be effected as close as reasonably possible to the inlet of mixer 12 to ensure that no vaporization occurs not only in the tubes of heater 56, but also in the connecting piping between heater 56 and mixer 12. Accordingly, the length of connecting piping between heater 56 and mixer 12 is minimized, which further reduces the likelihood of vaporization and concomitant two-phase flow.

In cases where the feed mixture contains a relatively high dissolved and/or suspended solid content, i.e., greater than about 10,000 ppm by weight of the feed mixture, it is more desirable that back pressure regulation be effected downstream of mixer 12, i.e., between mixer 12 and still 22. Once again, any type of flow restriction or back pressure regulator, which does not impart turbulent flow to the combination of the feed mixture and the recycle stream flowing through line 20 into the separation zone in still 22 can be employed. In any event, whether back pressure regulation be effected between mixer 12 and heater 56, or between mixer 12 and still 22, the net effect is the same, i.e., to minimize or prevent vaporization of liquid in the circulating loop comprising line 58, pump 52, heater 56, line 14, mixer 12, and line 20, especially in the tubes in heater 56.

It is apparent that the process of the present invention involves vacuum distillation as supplied by vacuum pump 24 or optimally an additional pump connected in line 82 in the embodiment shown in FIG. 2. Thus, still 22 is operated under vacuum conditions, and mixer 12 is also under vacuum conditions when back pressure regulation is effected between heater 56 and mixer 12. However, when back pressure regulation is effected between mixer 12 and separation zone 18, mixer 12. is then under positive pressure.

While, as noted above, the process of the present invention is applicable to a wide range of processing liquids, it is particularly useful for processing liquids used in processes involving the production, transportation, and use of natural gas. Thus, the process finds particular utility when the processing liquid comprises a compound(s) such as a liquid, water-soluble alkanolamine containing from 1 to 8 carbon atoms; a liquid, water-soluble amine containing from 1 to 6 carbon atoms; a water-miscible alcohol containing from 1 to 6 carbon atoms; and/or a glycol containing from 2 to 8 carbon atoms.

It will be appreciated that, while not shown in any of the drawings, valves, level controllers, reboiling loops, and other conventional processing equipment can be incorporated in a manner well known to those skilled in the art to optimize the process of the present invention such that the process can be conducted in a continuous fashion with maximum efficiency. For example, a reboiler could be incorporated into concentrator distiller 28 to add additional heat.

It will thus be seen that the process of the present invention makes it possible to continuously recover processing liquids, whether such liquids contain a relatively small amount of dissolved and/or entrained solids or a relatively large amount of dissolved and/or entrained solids. Indeed, by incorporating purge or blowdown with the high flow rates through heater 56 and back pressure regulation, in the case where the feed mixture contains relatively small amounts of the less volatile, dissolved and/or entrained component, recoveries of the processing liquid of 95% or greater can be achieved.

Likewise, by incorporating solids/liquid separation with back pressure regulation and high fluid flows in heater 56, processing liquid recoveries of 95% or greater can be accomplished from feed mixtures containing substantial amounts of dissolved and/or suspended solids.

The foregoing description and examples illustrate selected embodiments of the present invention. In light thereof, variations and modifications will be suggested to one skilled in the art, all of which are in the spirit and purview of this invention.

What is claimed is:

1. A process for recovering a processing liquid from a feed mixture comprising water, a processing liquid having a higher boiling point than water, and at least one component that is less volatile than said processing liquid, comprising:

providing a stream of said feed mixture;

introducing said stream of said feed mixture into a first heating zone and initially heating said feed mixture to a temperature sufficient to volatilize at least some of said water and at least a portion of said processing liquid, said temperature in said first heating zone being below the decomposition temperature of said processing liquid, to produce a vapor stream comprising said volatilized water and said volatilized portion of said processing liquid, and a residuum comprising said processing liquid and at least some of said at least one less volatile component;

separating said vapor stream from said residuum in a first separation zone;

passing at least a portion of said residuum through a second heating zone at a temperature below the decomposition temperature of said processing liquid to produce a heated, first recycle stream;

reducing the concentration of said less volatile component in said residuum;

admixing said heated recycle stream with said stream of said feed mixture to effect said initial heating of said feed mixture;

treating said vapor stream to recover a water stream and a purified processing liquid stream; and admixing, by recycle, at least a portion of at least one of said water stream and said purified processing stream with said stream of said feed mixture.

2. The process of claim 1 wherein at least some of said less volatile component is removed from said residuum by purging a portion of said residuum from said process.

3. The process of claim 1 wherein said residuum contains solids of said less volatile component and wherein a second portion of said residuum is passed through a solids/liquid separation zone to produce a substantially solids-free, second recycle stream and a substantially solids waste stream, said second recycle stream being recycled to said first separation zone.

4. The process of claim 1 wherein said second heating zone comprises a tubular heating zone and said residuum is passed through said second heating zone at a flow rate of greater than 10 feet per second, the pressure inside the second heating zone being regulated by back pressure regulation to minimize vaporization in said second heating zone.

5. The process of claim 4 wherein said residuum is passed through said second heating zone at a flow rate of from about 11 to about 16 feet per second.

6. The process of claim 4 wherein said back pressure regulation is effected between said second heating zone and said first heating zone, said initial heating of said feed mixture and said separating in said first separation zone being conducted under vacuum conditions.

7. The process of claim 4 wherein said back pressure regulation is effected between said first heating zone and said first separation zone, said first heating zone being under positive pressure, said separating in said first separation zone being conducted under vacuum conditions.

8. The process of claim 1 conducted on a continuous basis.

9. The process of claim 1 wherein said stream of said feed mixture contains at least one additional component more volatile than said processing liquid and water, and said vapor stream is separated in a second separation zone into a light fraction containing water and said at least one more volatile component and a heavy fraction containing said purified processing liquid stream, and said water stream is separated from said light fraction in a third separation zone.

10. A process for recovering a processing liquid from a feed mixture comprising water, a processing liquid having a higher boiling point than water, and at least one component that is less volatile than said processing liquid, comprising:

providing a stream of said feed mixture;

introducing said stream of said feed mixture into a first heating zone and initially heating said feed mixture to a temperature sufficient to volatilize at least some of said water and at least a portion of said processing liquid, said temperature in said first heating zone being below the decomposition temperature of said processing liquid, to produce a vapor stream comprising said volatilized water and said volatilized portion of said processing liquid, and a residuum comprising said processing liquid and at least some of said at least one less volatile component;

separating said vapor stream from said residuum in a first separation zone;

passing at least a portion of said residuum through a second heating zone at a temperature below the decomposition temperature of said processing liquid to produce a heated, first recycle stream;

reducing the concentration of said less volatile component in said residuum;

admixing said heated recycle stream with said stream of said feed mixture to effect said initial heating of said feed mixture;

treating said vapor stream to recover a water stream and a purified processing liquid stream;

separating said purified processing liquid stream into a low boiling liquid fraction and a high boiling fraction; and admixing, by recycle, at least a portion of at least one of said water stream, said high boiling fraction, and said low boiling fraction with said stream of said feed mixture.

11. The process of claim 10 wherein at least some of said less volatile component is removed from said residuum by purging a portion of said residuum from said process.

12. The process of claim 10 wherein said residuum contains solids of said less volatile component and wherein a second portion of said residuum is passed through a solids/liquid separation zone to produce a substantially solids-free, second recycle stream and a substantially solids waste stream, said second recycle stream being recycled to said first separation zone.

13. The process of claim 10 wherein said second heating zone comprises a tubular heating zone and said residuum is passed through said second heating zone at a flow rate of greater than 10 feet per second, the pressure inside the second heating zone being regulated by back pressure regulation to minimize vaporization in said second heating zone, said back pressure regulation being of a type that minimizes turbulent flow.

14. The process of claim 13 wherein said residuum is passed through said second heating zone at a flow rate of from about 11 to about 16 feet per second.

15. The process of claim 13 wherein said back pressure regulation is effected between said second heating zone and said first heating zone, said initial heating of said feed mixture and said separating in said first separation zone being conducted under vacuum conditions.

16. The process of claim 13 wherein said back pressure regulation is effected between said first heating zone and said first separation zone, said first heating zone being under positive pressure, said separating in said first separation zone being conducted under vacuum conditions.

17. The process of claim 10 conducted on a continuous basis.

* * * * *